UNITED STATES PATENT OFFICE.

IRA F. TRAUTMAN, OF NEW YORK, N. Y.

PROCESS OF MAKING CORES FOR AUTOMOBILE-TIRES.

1,041,377. Specification of Letters Patent. Patented Oct. 15, 1912.

No Drawing. Application filed October 25, 1911. Serial No. 656,632.

*To all whom it may concern:*

Be it known that I, IRA F. TRAUTMAN, a citizen of the United States, and a resident of the city of New York, borough of Brooklyn, county of Kings, and State of New York, have invented a new and useful Improvement in the Process of Making Cores for Automobile-Tires, of which the following is a specification.

The object of my invention is to make a core for automobile tires which will have all the advantages of a pneumatic tire and none of the disadvantages, which is made in the manner which I will now describe.

As my improved core takes the place of a pneumatic tube in an automobile tire, it is obvious that the tire is not changed, except that my improved core is substituted for the tube. For this reason the core should fit the shoe of a tire just the same as an inflated tube and hold the shoe with sufficient firmness to permit its use in the conventional manner.

The process by which I carry out my invention is as follows: Crude rubber is first mixed with any suitable compound, such as sulfur, which enables it to be vulcanized. It is also mixed with a suitable proportion of a gas generator, such as sodium carbonate, vinegar, ammonium carbonate, alum or any other suitable gas generator, and this mixture, when properly formed is first made into the shape of an annulus, the cross-section of which corresponds to, but is smaller than the cross-section of the finished product, and of a size, diameter, etc., corresponding to the finished product. Where a heavy car is to be carried by the core, the cross-section of the annulus is a little less than the cross-section of the finished product, say one-quarter of an inch less in diameter, and where a light car is to be carried, the cross-section of the annulus may be one-half or three-quarters of an inch less than the corresponding dimension of the finished product. In any event, after the annulus has been formed it is carefully wrapped by tape, which is preferably made of sea island duck, with raw rubber placed on one surface, the fabric being cut in parallel strips on bias, although it is obvious that any other suitable tape may be used. This tape is then wrapped around the annulus, much as an armature coil is wound for a dynamo, so that the edges of the tape overlap. The wrapping differs from that of an armature coil in that the tape on the annulus is not wrapped tight, but is flexible and loose and so arranged and disposed that it will, when stretched taut, fit the interior of the mold with sufficient tightness for the purposes intended, so that the annulus, when finished, will consist of sponge rubber with an exterior coating of tape fastened to the rubber whereby a sufficiently strong and firm, but not too firm, structure is established. The core when so formed is placed in a suitable mold and vulcanized. The vulcanization is preferably carried on in a steam vulcanizer heated to substantially 280 degrees Far., the steam being shut off from time to time to prevent burning or excessive vulcanization of a part of the core while the remainder is not cured or vulcanized. The number of times the steam is turned on and off and the length of these periods of heating and cooling will depend upon the size of the core and the consistency thereof, different mixtures requiring slightly different treatment in this respect. When the vulcanization is complete the core is removed from the mold and is ready for use, the expanding of the sponge rubber having filled the tape wrapping, stretched it tight and secured the wrapping to the core.

While I have shown and described one method of carrying out my improved processes, it is obvious that it is not restricted thereto, but is broad enough to cover all structures coming within the scope of the annexed claims.

What I claim is,

1. A process of making a tire core consisting in shaping a mixture of crude rubber, sulfur and a gas generator into the form of an annulus, wrapping tape about the same so that the tape, when stretched on the finished product, will fit snug against it and fill the core mold, placing this annulus in a suitable core mold and vulcanizing the annulus so placed whereby a core of sponge rubber inclosed in a tight fitting envelop is produced under pressure.

2. A process of making a tire core consisting in shaping a mixture of crude rubber, sulfur and a gas generator into the form of an annulus, wrapping tape about the same so that the tape, when stretched on the finished product, will fit snug against it and fill the core mold, placing this annulus in a suitable core mold and vulcanizing with several heats the annulus so placed whereby a core of sponge rubber inclosed in a tight-fitting envelop is produced under pressure.

IRA F. TRAUTMAN.

Witnesses:
E. C. WINTRINGHAM,
RICHARD CANNON.